United States Patent [19]
Tixier et al.

[11] Patent Number: 5,952,606
[45] Date of Patent: Sep. 14, 1999

[54] GAS-INSULATED ELECTRIC CABLE

[75] Inventors: René Tixier, Lyons; Van Doan Pham, Meyzieu, both of France

[73] Assignee: GEC Alsthom T & D SA, Paris, France

[21] Appl. No.: 08/839,802

[22] Filed: Apr. 18, 1997

[30] Foreign Application Priority Data

Apr. 19, 1996 [FR] France .................................. 96 04932

[51] Int. Cl.$^6$ .................................................. H02G 15/24
[52] U.S. Cl. ........................................................ 174/21 R
[58] Field of Search .............................. 174/21 R, 21 JS, 174/21 C, 21 CA, 22 C

[56] References Cited

U.S. PATENT DOCUMENTS 3,787,604  1/1974  Guaglione .................................. 174/18

FOREIGN PATENT DOCUMENTS

0660478A1  6/1995  European Pat. Off. .
1333287    6/1963  France .
2234689    1/1975  France .
2509080    1/1983  France .
93168322 U 5/1994  Germany .

*Primary Examiner*—Kristine Kincaid
*Assistant Examiner*—William H. Mayo, III
*Attorney, Agent, or Firm*—Sughrue, Mion, Zinn, Macpeak & Seas, PLLC

[57] ABSTRACT

A gas-insulated cable having a plurality of lengths connected end to end, each length containing three conductors with the ends of the conductors of a length having respective metal endpieces engaging in respective cylindrical terminal metal portions of the corresponding conductors of the adjacent length, the terminal portions being provided with respective internal contacts co-operating with the endpieces, wherein a respective insulating sleeve of length substantially equal to twice its diameter is disposed around each of the endpieces and between the endpiece and the inside wall of the terminal portion.

3 Claims, 1 Drawing Sheet

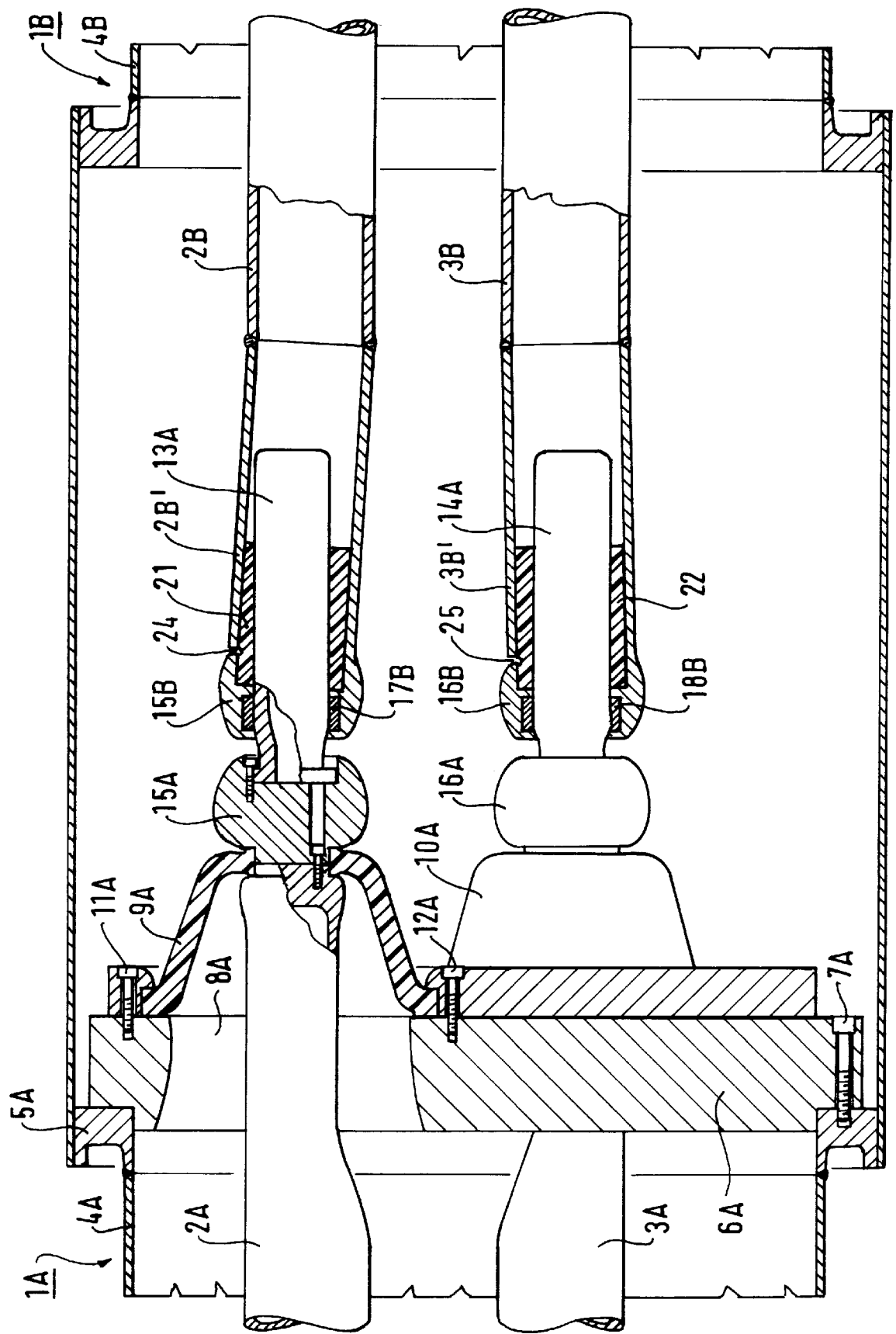

GAS-INSULATED ELECTRIC CABLE

BACKGROUND OF THE INVENTION

A gas-insulated three-phase cable made up of lengths that are about 100 meters long has already been described, in particular in French patent application No. 93 15 355. Each length is made by welding together elements that are themselves about 10 meters long. Each of these elements comprises:

- a cylindrical steel case that withstands the internal pressure of the insulating gas, which is preferably nitrogen under a pressure of about 10 bars;
- a cylindrical aluminum case, coaxial with the steel case and serving as a magnetic screen between the conductors and the steel case; and
- three conductors disposed inside the aluminum case and disposed parallel to one another and to the axis of the cases. The conductors are held in place by insulating arms supported by metal arches.

At one of the ends of each length, there is placed a metal disk which is secured to the steel case. The disk is provided with three openings through which the ends of the conductors pass. The conductor ends are held in insulating cones fixed to the metal disk. A conductor in a given length is electrically connected by engaging the end of the conductor in a metal sleeve fixed to the end of the conductor of the adjacent length. The inside of the sleeve is provided with contact pieces, e.g. of the concertina type. This sliding contact makes it possible to continue passing current in spite of differential expansion between the conductors and the case of a length.

To be sure of providing sufficient insulation distance between the conductors and the metal disk which is at ground potential, it is necessary to reduce the section of the conductors where they pass through the openings and where they approach said zone, and to do so on both sides of the disk. In the event of the conductors carrying overload current, large attraction forces appear between the conductors, thereby generating vibration at twice the frequency of the current. Such vibration, accentuated by the smaller diameter of the conductors at their ends, gives rise to pitting of the contacts, thereby degrading them and producing harmful heating.

OBJECTS AND SUMMARY OF THE INVENTION

An object of the present invention is to provide a junction between conductors of adjacent lengths while avoiding the above-mentioned drawbacks.

The invention provides a gas-insulated cable comprising a plurality of lengths connected end to end, each length containing three conductors with the ends of the conductors of a length having respective metal endpieces engaging in respective cylindrical terminal metal portions of the corresponding conductors of the adjacent length, said terminal portions being provided with respective internal contacts co-operating with said endpieces, wherein a respective insulating sleeve of length substantially equal to twice its diameter is disposed around each of said endpieces and between the endpiece and the inside wall of said terminal portion.

Said sleeve has a cylindrical outside surface and a cylindrical inside bore, the respective axes of said outside surface and said bore being at an angle to each other which is equal to the angle between said endpiece and said terminal portion.

Said angle is about 3.2 degrees.

Said sleeve is made of an insulating material, that withstands a temperature of not less than 110° C., and that is easily machined.

Said insulating material is polytetrafluoroethylene.

BRIEF DESCRIPTION OF THE DRAWING

The invention is explained in detail by the following description of a particular embodiment given with reference to the accompanying drawing, in which:

the sole FIGURE is a fragmentary elevation view, partially in section, of a portion of a gas-insulated three-phase cable of the invention, showing the ends of two adjacent lengths.

MORE DETAILED DESCRIPTION

In the FIGURE, references 1A and 1B designate respectively two adjacent lengths of a gas-insulated three-phase cable.

Two conductors 2A and 3A can be seen of the three conductors of the length 1A, and they are intended for connection to corresponding conductors 2B and 3B of the length 1B. The conductors are preferably made of aluminum. In the description below, the third conductor is never mentioned, but it must be understood that it is present and that it is fitted in the same manner as the other two conductors. Also, for simplification purposes, the drawing does not show the aluminum case of the cable that acts as a magnetic screen between the conductors and the steel case.

The length 1A has a steel case 4A, while the length 1B has a steel case 4B. The end of the length 1A has a ferrule 5A welded onto the steel case 4A.

A disk 6A is fixed to the ferrule 5A by screws 7A and closes the end of the length 1A. The disk 6A is provided with through openings such as 8A through which the conductors pass. To maintain insulation distances between the various live conductors and the disk 6A which is at the same potential as the external case 1A, and thus at ground potential, each conductor where it passes through an opening and in the immediate upstream and downstream vicinity thereof is of reduced diameter. Sealing of the length 1A and support of the conductors are provided by insulating cones such as 9A and 10A which are fixed to the disk 6A by screws, such as screws 11A and 12A. The conductors 2A and 3A pass through the respective insulating cones in sealed manner and, where they leave the cones, are connected respectively to conductive endpieces 13A and 14A which are preferably made of copper. Anticorona globes 15A and 16A, preferably made of aluminum, serve to ensure that equipotential surfaces are uniform in the vicinity of the insulating cones. These globes are screwed onto the ends of the conductors and the endpieces are screwed to the globes. To maintain insulation distances between the anticorona globes, it is necessary to move the ends of the conductors of the length 1A so that they are not on the axes of the conductors of the length 1B. That is why the ends of the conductors 2B and 3B have respectively welded terminal portions 2B' and 3B' that are inclined at a shallow angle relative to the general direction of the conductors. In the example shown in the FIGURE, this angle is 3.2 degrees. The ends of the terminal portions 2B' and 3B' include respective swollen portions 15B and 16B constituting anticorona protection and including internal contacts 17B and 18B which may be of the "concertina" type, for example.

The endpieces 13A and 14A are engaged respectively in the terminal portions 2B' and 3B' of the conductors 2B and 3B, and electrical contact is ensured between said endpieces and the above-mentioned contacts. To attenuate vibrations that may appear between the pieces that are in contact, the invention provides for disposing sleeves 21 and 22 around the endpieces 13A and 14A. These sleeves are made of an insulating material that withstands a temperature of as much as 110° C. and that is easy to machine, thereby making it possible to obtain tight dimensional tolerances so as to limit movement of the concertina sliding contact over its entire circumference. It is preferable to select polytetrafluoroethylene as sold under the registered trademark "TEFLON". In the example shown in the FIGURE, the sleeves have cylindrical outside surfaces and inside bores that are likewise cylindrical. The axes of the above-mentioned cylindrical surfaces are at an angle to each other which is equal to the angle between the terminal portions 2B' and 3B' and the general direction of the conductors 2B and 3B, i.e. in the present example, an angle of 3.2 degrees. The sleeves 21 and 22 are of a length that is substantially equal to twice their diameter.

The sleeves 21 and 22 are held in place by punching the terminal portions 2B' and 3B', e.g. at three locations that are angularly spaced apart by 120°. References 24 and 25 show the locations of such punching.

The invention is inexpensive to implement and it completely solves the problem posed.

The invention is also applicable to gas-insulated electric cables for a single phase only.

We claim:

1. A gas-insulated cable comprising at least two lengths connected end to end, each of said lengths containing one or more conductors with ends of the conductors having respective metal endpieces engaging in respective cylindrical terminal metal portions of corresponding ones of said conductors of an adjacent one of said lengths, said terminal portions being provided with respective internal contacts co-operating with said endpieces, wherein a respective insulating sleeve is disposed around each of said endpieces and between the endpieces and an inside wall of said terminal portions, wherein said sleeve has a cylindrical outside surface and a cylindrical inside bore, respective axes of said outside surface and said bore being at an angle to each other which is substantially equal to an angle between said endpieces and said terminal portions, and wherein said angle between the respective axes of said outside surface and said bore is about 3.2 degrees.

2. A cable according to claim 1, wherein said sleeve is made of an insulating material that withstands a temperature of not less than 110° C.

3. A cable according to claim 2, wherein said insulating material is polytetrafluoroethylene.

* * * * *